US012693416B2

(12) United States Patent
Yamauchi et al.

(10) Patent No.: US 12,693,416 B2
(45) Date of Patent: Jul. 28, 2026

(54) OPTICAL MEASUREMENT DEVICE

(71) Applicant: Mitsubishi Electric Corporation,
Tokyo (JP)

(72) Inventors: Takanori Yamauchi, Tokyo (JP);
Junya Nishioka, Tokyo (JP); **Hiroki
Goto, Tokyo (JP); Naoki Suzuki,**
Tokyo (JP)

(73) Assignee: **MITSUBISHI ELECTRIC
CORPORATION,** Tokyo (JP)

( * ) Notice: Subject to any disclaimer, the term of this
patent is extended or adjusted under 35
U.S.C. 154(b) by 571 days.

(21) Appl. No.: 18/225,490

(22) Filed: Jul. 24, 2023

(65) Prior Publication Data

US 2023/0367011 A1      Nov. 16, 2023

Related U.S. Application Data

(63) Continuation     of     application     No.
PCT/JP2021/014590, filed on Apr. 6, 2021.

(51) Int. Cl.
    *G01S 17/34*          (2020.01)
    *G01S 7/481*          (2006.01)
(52) U.S. Cl.
    CPC ............ *G01S 17/34* (2020.01); *G01S 7/4818*
                                                      (2013.01)
(58) Field of Classification Search
    CPC ...... G01S 17/34; G01S 7/4818; G01S 7/4913;
                                  G01B 2290/60; G01B 9/02007;
    (Continued)

(56) References Cited

U.S. PATENT DOCUMENTS 6,573,996 B1      6/2003  Deliwala et al.
10,578,740 B2 *   3/2020  Desai ................... H01S 5/0683
                          (Continued)

FOREIGN PATENT DOCUMENTS

CN       108562887 A     9/2018
JP       2001-41706 A    2/2001
                (Continued)

OTHER PUBLICATIONS

Great Britain Office Action for Great Britain Application No.
GB2315028.7, dated Nov. 13, 2023.
                (Continued)

*Primary Examiner* — Joshua D Huson
*Assistant Examiner* — Vicente Rodriguez
(74) *Attorney, Agent, or Firm* — Birch, Stewart, Kolasch
& Birch, LLP

(57)                ABSTRACT
An optical measurement device is a measurement device
that measures a distance to a target using light, and includes:
a split unit to split light into reference light and measurement
light; an adjustment unit to split the reference light into a
plurality of beams of reference light having respective
different light path lengths; an interference unit to multiplex
two of reflection light obtained by reflection when a target
is irradiated with the measurement light, and the plurality of
beams of reference light to obtain interference light; and a
processing unit to calculate a light path length difference on
a basis of a frequency of the interference light, and the
optical measurement device calculates light path length
differences of the plurality of beams of reference light, so
that it is possible to measure the distance to the target even
when the distance to the target significantly fluctuates.

5 Claims, 5 Drawing Sheets

(58) Field of Classification Search

CPC .............. G01B 9/02003; G01B 11/026; G01B 11/2441; G01C 3/08

See application file for complete search history.

(56) References Cited

U.S. PATENT DOCUMENTS

| | | | |
|---|---|---|---|
| 2005/0219544 A1* | 10/2005 | Chan .................... A61B 5/0066 | |
| | | | 356/497 |
| 2009/0091766 A1 | 4/2009 | Hirose | |
| 2009/0244547 A1 | 10/2009 | Ozawa | |
| 2011/0273699 A1* | 11/2011 | Sebastian ................ G01S 17/32 | |
| | | | 356/4.09 |
| 2015/0131078 A1* | 5/2015 | Soreide ................... G01S 17/36 | |
| | | | 356/4.1 |
| 2016/0291137 A1 | 10/2016 | Sakimura et al. | |
| 2020/0309952 A1 | 10/2020 | Imaki et al. | |
| 2020/0319314 A1 | 10/2020 | Behzadi et al. | |
| 2021/0405194 A1 | 12/2021 | Tsuchida | |

FOREIGN PATENT DOCUMENTS

| | | | |
|---|---|---|---|
| JP | 2008-268121 A | 11/2008 | |
| JP | 2009-103688 A | 5/2009 | |
| JP | 2009-222665 A | 10/2009 | |
| JP | 2009-244207 A | 10/2009 | |
| JP | 2010-17466 A | 1/2010 | |
| JP | WO2015/087564 A1 | 6/2015 | |
| JP | WO2019/130472 A1 | 7/2019 | |
| JP | 2020-85723 A | 6/2020 | |
| WO | WO 2021/000026 A1 | 1/2021 | |

OTHER PUBLICATIONS

Haruna, "Optical Coherence Tomography (OCT)", Medical Photonics No. 1, Apr. 2010, online, total 7 pages, (URL: http://www.medicalphotonics.jp/pdf/mp0001/0001_029.pdf).

International Search Report for PCT/JP2021/014590 filed on Apr. 6, 2021 and mailed on Jun. 22, 2021.

Onuma, "Measurement principle and clinical application of Swept Source OCT (Illustrated)", Japanese journal of visual science, vol. 34, No. 1, Japanese journal of visual science, 2013, pp. 20-26, total 8 pages, <URL:https://www.jstage.jst.go.jp/article/jpnjvissci/34/1/34_34.20/_pdf).

* cited by examiner

OPTICAL MEASUREMENT DEVICE

CROSS REFERENCE TO RELATED APPLICATION

This application is a Continuation of PCT International Application No. PCT/JP2021/014590, filed on Apr. 6, 2021, which is hereby expressly incorporated by reference into the present application.

TECHNICAL FIELD

The present disclosure relates to an optical measurement device.

BACKGROUND ART

There is an optical distance measurement method of measuring a distance to a target by a pulse propagation method, a triangulation method, a confocal method, a white interference method, a wavelength scanning interference method, and the like. The white inference method and the wavelength scanning interference method, and the like among these methods are interference methods that use light interference phenomena. The interference methods split light emitted from a light source into measurement light and reference light, causes reflection light that is light obtained by reflection of the measurement light on the target, and the reference light to interfere with each other, and measures a distance to the target based on a condition that the reflection light and the reference light enhance each other.

For example, an optical measurement device described in Patent Literature 1 uses a light interference phenomenon. Output light of a semiconductor laser subjected to frequency modulation is split into two beams of light by a beam splitter, one of the beams is reference light, and the other one of beams is probe light. The probe light is radiated on a target through an optical circulator. Scattered light from the target is guided to the beam splitter through the optical circulator, and the scattered light and the reference light are multiplexed and are received by an optical detector. Between the reference light subjected to frequency modulation and the scattered light, there is a time difference corresponding to a distance to the target, and therefore a frequency difference is produced. A beat signal corresponding to the frequency difference is produced in an output of the optical detector.

CITATION LIST

Patent Literatures

Patent Literature 1: JP 2020-85723 A ([0053] on page 8 and FIG. 1)

SUMMARY OF INVENTION

Technical Problem

The optical measurement device described in Patent Literature 1 multiplexes the scattered light and the reference light, and produces the beat signal. However, when the distance to the target significantly fluctuates, a light path length difference between the reference light and the scattered light becomes great, and therefore there has been a problem that the beat signal is not produced, and it is not possible to perform distance measurement.

The present disclosure has been made to solve the above-described problem, and an object of the present disclosure is to make it possible to measure a distance to a target even when the distance to the target significantly fluctuates.

Solution to Problem

An optical measurement device includes: a splitter to split light into reference light and measurement light; an adjuster to split the reference light into a plurality of beams of reference light having respective different light path lengths; interference circuitry to obtain first interference light obtained by multiplexing reflection light obtained by reflection when a target is irradiated with the measurement light, and one of two beams of reference light of the plurality of beams of reference light, obtain second interference light obtained by multiplexing the measurement light that is not yet radiated on the target and the other one of the two beams of reference light, and obtain third interference light obtained by multiplexing the two beams of reference light; and processing circuitry to calculate a light path length difference between the reflection light and the one of the two beams of reference light on a basis of a frequency of the first interference light, calculate a light path length difference between the measurement light that is not yet radiated on the target and the other one of the two beams of reference light on a basis of a frequency of the second interference light, and calculate a light path length difference between the two beams of reference light on a basis of a frequency of the third interference light, and the optical measurement device measures a distance to the target on a basis of each of the light path length differences calculated by the processing circuitry.

Advantageous Effects of Invention

Even when a distance to a target significantly fluctuates, it is possible to measure the distance to the target.

DESCRIPTION OF EMBODIMENTS

Embodiment 1

Figure 1:
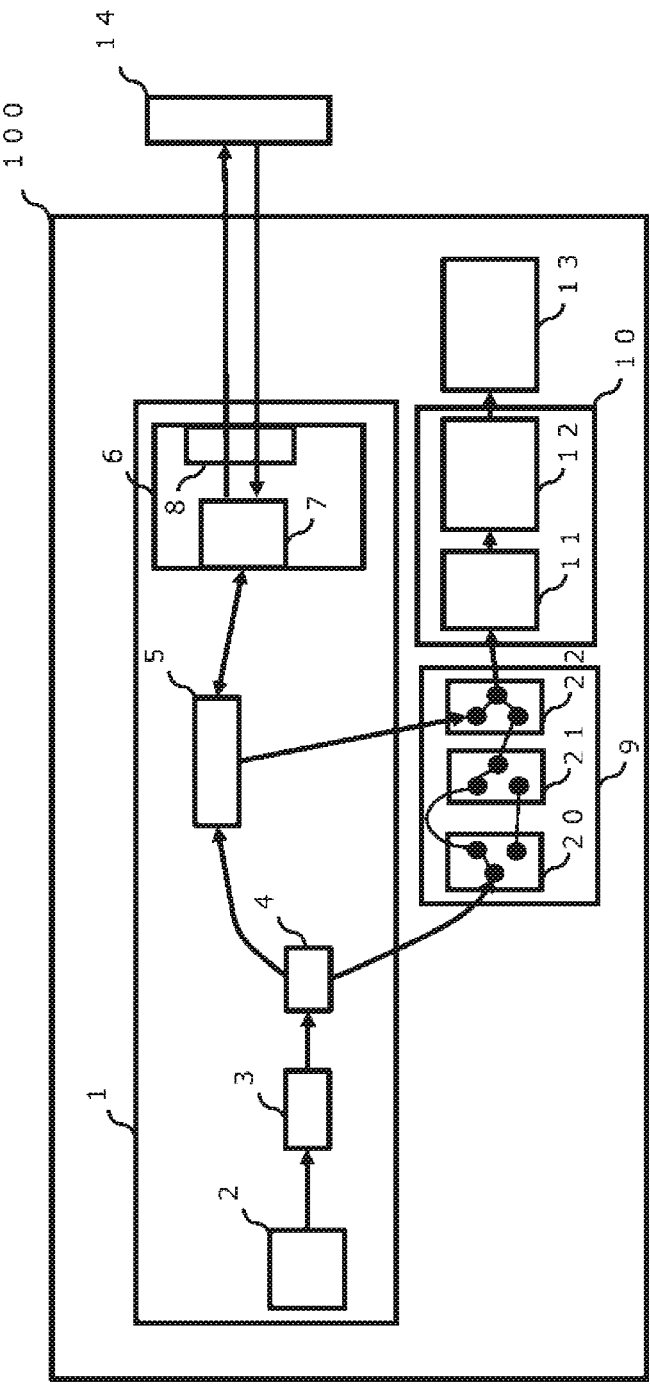
FIG. 1 is a configuration diagram illustrating an example of a case where a distance is measured using an optical measurement device 100 according to Embodiment 1.

Hereinafter, an optical measurement device 100 according to Embodiment 1 will be described in detail with reference to the drawings. Note that following Embodiment 1 is one specific example. Accordingly, a shape, arrangement, a material, and the like of each component are examples, and do not intend to be limited thereto. Furthermore, each drawing is a schematic diagram, and is not strictly illustrated. Furthermore, the same components are assigned the same reference numerals in each drawing.

FIG. 1 is a configuration diagram illustrating an example of a case where distance measurement is performed using the optical measurement device 100 according to Embodiment 1. The optical measurement device 100 irradiates a target 14 with light, receives reflection light, and measures a distance to the target 14.

<Configuration of Optical Measurement Device 100>

The optical measurement device 100 includes a transmission unit 1, an adjustment unit 9, and a reception unit 10. The optical measurement device 100 may include a processing unit 13.

<<Transmission Unit 1>>

The transmission unit 1 includes a split unit 4. The transmission unit 1 may include a light source 2, a sweep unit 3, a circulator 5, and an irradiation unit 6. The transmission unit 1 emits light, and receives reflection light.

<<Light Source 2>>

The light source 2 emits light. The light source 2 emits, for example, laser light. The light source 2 emits, for example, continuous light. The light source 2 emits, for example, laser light of a predetermined frequency.

<<Sweep Unit 3>>

The sweep unit 3 continuously changes the wavelength of light. The sweep unit 3 sweeps the wavelength of input light, and outputs the light as swept light.

<<Split Unit 4>>

The split unit 4 splits light. The split unit 4 includes, for example, an optical coupler or the like.

<<Circulator 5>>

The circulator 5 restricts a traveling direction of light. The circulator 5 is, for example, a 3-port optical circulator. The 3-port optical circulator emits light incident on a port 1 to a port 2, and emits the light incident on the port 2 to a port 3.

<<Irradiation Unit 6>>

The irradiation unit 6 irradiates the target 14 with light. The irradiation unit 6 may include a connector 7 and a lens 8.

<<Connector 7>>

The connector 7 is, for example, a connector that is attached to an end of an optical fiber.

<<Lens 8>>

The lens 8 condenses light. The lens 8 is formed using one or more transmission lenses, reflective lenses, or the like.

<<Adjustment Unit 9>>

The adjustment unit 9 switches a light route. The adjustment unit 9 includes, for example, an optical switch, a Variable Optical Attenuator (VOA), or the like. Details of the adjustment unit 9 will be described later. Note that the adjustment unit 9 generates interference light, and therefore is an interference unit, too.

<<Reception Unit 10>>

The reception unit 10 receives light. The reception unit 10 photoelectrically converts light into an electric signal, and outputs the electric signal. The reception unit 10 may include a photoelectric conversion unit 11 and a digital conversion unit 12.

<<Photoelectric Conversion Unit 11>>

The photoelectric conversion unit 11 photoelectrically converts light into an electric signal, and outputs the electric signal. The photoelectric conversion unit 11 is, for example, a photoelectric converter.

<<Digital Conversion Unit 12>>

The digital conversion unit 12 A/D-converts an analog signal into a digital signal, and outputs the digital signal. The digital conversion unit 12 is, for example, an A/D converter.

<<Processing Unit 13>>

The processing unit 13 calculates a distance from a frequency spectrum of an interference wave. The processing unit 13 includes, for example, a processor, a memory, and the like. The processing unit 13 is, for example, a PC.

<<Optical Fiber>>

The light source 2 and the sweep unit 3, the sweep unit 3 and the split unit 4, the split unit 4 and the circulator 5, the split unit 4 and the adjustment unit 9, the circulator 5 and the connector 7, the circulator 5 and the adjustment unit 9, and the adjustment unit 9 and the photoelectric conversion unit 11 are connected by, for example, optical fibers. Laser light is guided through the optical fibers.

<Other Configuration>

<<Target 14>>

The target 14 is a target to which a distance is measured. The target 14 may be any target as long as the target reflects light.

<Operation of Optical Measurement Device 100>

Next, an operation of the optical measurement device 100 will be described.

Light emitted from the light source 2 in the transmission unit 1 is incident on the sweep unit 3. Note that the light source 2 may be provided outside the optical measurement device 100.

The sweep unit 3 sweeps the wavelength of the incident light, and outputs the light as swept light. The swept light is, for example, laser light of a continuous wave, and the frequency thereof continuously changes. Note that the sweep unit 3 may be provided outside the optical measurement device 100.

The swept light output from the sweep unit 3 is input to the split unit 4. The split unit 4 splits the swept light into two beams. One of the two split beams of swept light is input to the circulator 5 and the other input to the adjustment unit 9. The swept light input to the circulator 5 is measurement light. The swept light input to the adjustment unit 9 is reference light.

The circulator 5 outputs, to the irradiation unit 6, the measurement light input from the split unit 4. The circulator 5 does not output, to the adjustment unit 9, the measurement light input from the split unit 4.

The irradiation unit 6 emits, from the connector 7, the measurement light input from the circulator 5. The connector 7 may reflect part of the measurement light, and output the part of the measurement light to the circulator 5. The lens 8 collimates and condenses the measurement light emitted from the connector 7, and then irradiates the target 14 with the measurement light. Alternatively, the measurement light emitted from the connector 7 is directly radiated on the target 14 without the lens 8. Hence, the irradiation unit 6 irradiates the target 14 with the measurement light.

The measurement light (referred to as reflection light) reflected by the target 14 is incident on the irradiation unit 6. The reflection light incident on the irradiation unit 6 is output to the circulator 5 through the connector 7. The irradiation unit 6 outputs the reflection light to the circulator 5.

The circulator 5 outputs, to the adjustment unit 9, the measurement light (reflection light) input from the irradiation unit 6 and reflected by the target 14. That is, the circulator 5 outputs, to the irradiation unit 6, the measurement light from the split unit 4, and outputs, to the adjustment unit 9, the measurement light from the irradiation unit 6. Furthermore, the circulator 5 may output, to the adjustment unit 9, the measurement light reflected by the connector 7 together.

The adjustment unit 9 can calculate a light path length of the reference light from the split unit 4. The adjustment unit 9 can cause the measurement light from the circulator 5 and the reference light from the split unit 4 to interfere with each other, and output the interference light. The adjustment unit 9 can cause two beams of reference light having different light path lengths to interfere with each other, and output interference light. Causing beams of light to interfere with each other produces a beat signal. Hence, the adjustment unit 9 is an interference unit, too.

The adjustment unit 9 includes, for example, switch units 20, 21, and 22. In FIG. 1, when switches of the switch units 20, 21, and 22 select a lower side, a lower side, and both, respectively, the adjustment unit 9 can cause reference light and measurement light to interfere with each other. Furthermore, when the switches of the switch units 20, 21, and 22 select an upper side, an upper side, and both, respectively, the adjustment unit 9 can cause measurement light and reference light whose light path length has been changed to interfere with each other. Furthermore, when the switches of the switch units 20, 21, and 22 select both, both, and a lower side respectively, the adjustment unit 9 can cause two beams of reference light having different light path lengths to interfere with each other.

The reception unit 10 receives an interference wave output from the adjustment unit 9. In the reception unit 10, the photoelectric conversion unit 11 photoelectrically converts interference light, and outputs an analog signal indicating the interference light. The digital conversion unit 12 A/D-converts an analog signal from the photoelectric conversion unit 11, and then outputs a reception signal as a digital signal.

The processing unit 13 calculates a measurement distance from a frequency spectrum of the interference light on the basis of the reception signal. More specifically, for example, the processing unit 13 measures the frequency spectrum of the interference light by performing Fourier transform on the reception signal. The measurement distance is determined on the basis of a light path length difference between the measurement light and the reference light. The frequency obtained when the light path length difference between the measurement light and the reference light from the split unit 4 is 0 is 0, and the frequency of the interference light becomes higher in proportion to the light path length difference. The frequency of the interference light is measured to perform distance measurement on a measurement target. In this case, the light path length difference from which the frequency spectrum of the interference light can be obtained is restricted by a coherence length.

When the light path length difference between the measurement light and the reference light is within a range of the coherence length or less of the light source, light interference is detected. The coherence length for determining a measurable range that can be measured at a time differs depending on a specification of the light source. According to equation (1), it is possible to obtain a coherence length lc.

$$lc = (c/\Delta v) \times (2\ \ln 2/\pi) \qquad (1)$$

In this equation, c represents a light speed, and Δv represents a line width of the light source.

According to equation (1), the coherence length is inversely proportional to the line width of the light source. A light source having a narrower line width is generally more costly. In order to obtain a wider measurement range using a low-cost light source, a mechanism that adjusts a delay length of reference light is provided, and a light path length is changed to expand a substantial measurement range.

Figures 2A, 2B, 2C:
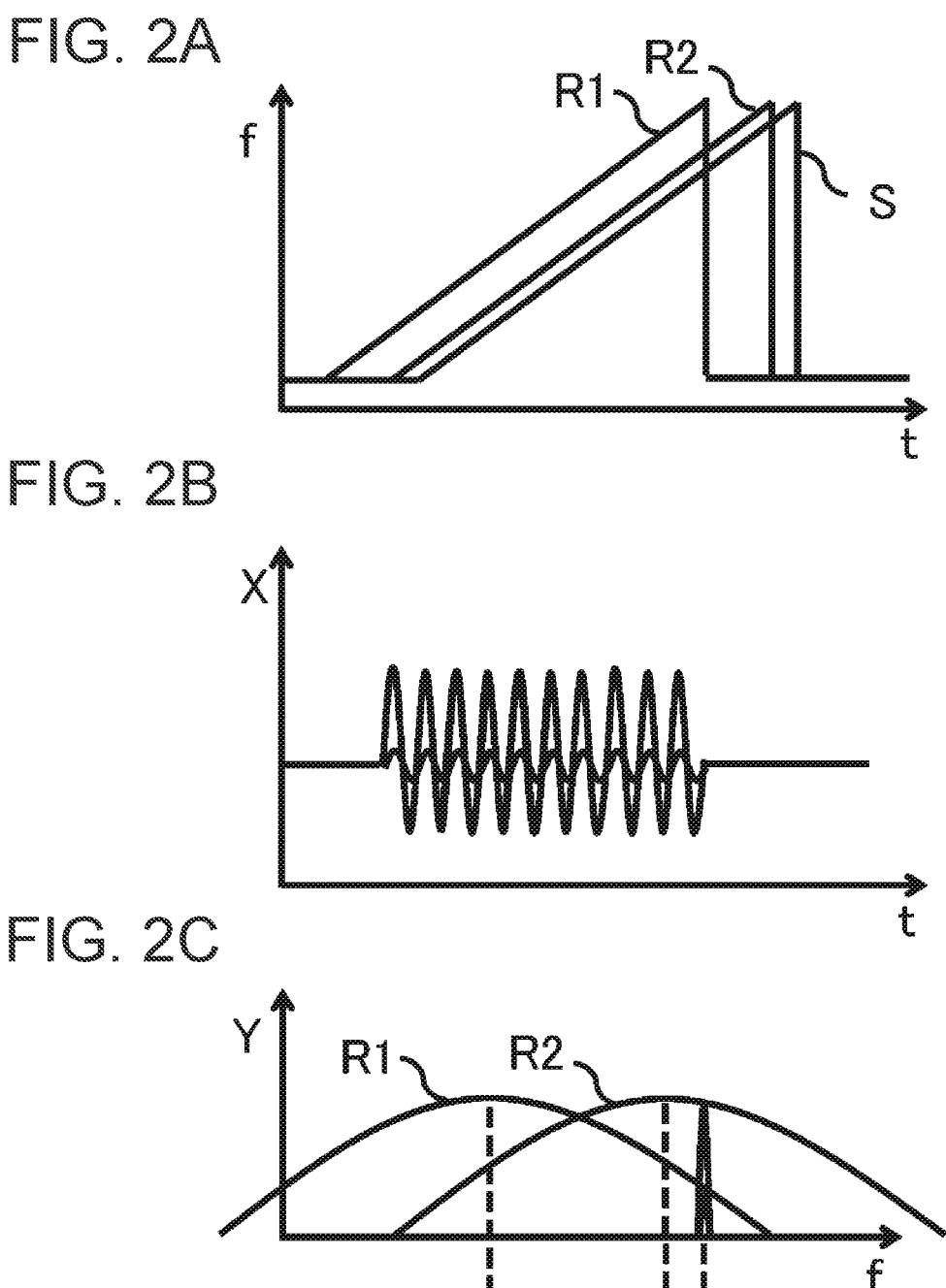
FIGS. 2A to 2C are explanatory views related to frequencies of reference light and measurement light.

Next, a method in the optical measurement device 100 according to Embodiment 1 of measuring a position of the target 14 will be described. FIGS. 2A to 2C are explanatory views related to frequencies of reference light and measurement light. FIG. 2A illustrates temporal change of the frequencies of the reference light and the reflection light. FIG. 2B illustrates temporal change of an intensity of interference light. FIG. 2C illustrates an example of a frequency spectrum after Fourier transform is performed on the interference light.

A light path length of the measurement light changes depending on a distance to the target 14. FIG. 2A illustrates an example where a light path length of measurement light S is longer than light path lengths of two types of reference light R1 and R2. It is assumed that a light path length from the sweep unit 3 to the adjustment unit 9 is long in order of measurement light S>reference light R2>reference light R1. The reference light R1 is, for example, a light path that passes on a lower side of the switch unit 20. The reference light R2 is, for example, a light path that passes on an upper side of the switch unit 20.

The frequencies of the measurement light S, the reference light R2, and the reference light R1 inserted by the sweep unit 3 increase as time passes. Hence, the frequency of the measurement light S is the lowest in the adjustment unit 9. Furthermore, light of a certain specific frequency that reaches the adjustment unit 9 the latest is the measurement light S. In FIG. 2A, trajectories of the frequencies are shifted rightward in order of the reference light R1, the reference light R2, and the measurement light S, that is, delay occurs. As the distance to the target 14 becomes more distant, the trajectory of the frequency of the measurement light S is shifted rightward more. Furthermore, frequency differences of the measurement light S from the reference light R1 and R2 become greater.

FIG. 2B illustrates intensity signals X with respect to a time of interference light obtained in the adjustment unit 9 by multiplexing the reference light R1 and the measurement light S, and the reference light R2 and the measurement light S. In this case, when the light path length difference between the reference light and the measurement light is little, it is possible to obtain interference light having a strong amplitude in accordance with a coherence length. On the other hand, when the light path length difference between the reference light and the measurement light is great, it is possible to obtain interference light having a weak amplitude in accordance with a coherence length. In FIG. 2B, interference light of the reference light R1 and the measurement light S has a weak amplitude, and interference light of the reference light R2 and the measurement light S has a strong amplitude.

FIG. 2C is a view illustrating the frequency spectrum of the interference light in FIG. 2B. In FIG. 2C, a horizontal axis indicates a frequency f, and a vertical axis indicates an intensity Y of interference light. The intensity Y of the frequency spectrum becomes lower as the light path length difference between the reference light and the measurement light becomes greater. In this case, a value that lowers by 3 dB from a maximum value (a value at which the intensity is ½) is defined as a coherence length.

The coherence length is inversely proportional to the line width of the light source as expressed in equation (1). Even when, for example, the line width of the light source 2 is narrow, the coherence length is limited to approximately several tens of mm. The reference light R2 can provide a frequency spectrum having a strong intensity, and the reference light R1 can provide a weak frequency spectrum. Consequently, in a case where distance measurement is performed on the basis of the position of the frequency spectrum using the light path length difference between the measurement light and the reference light, the reference light having a less light path length difference from the target measurement light enables more accurate measurement.

Figures 3A, 3B, 3C:
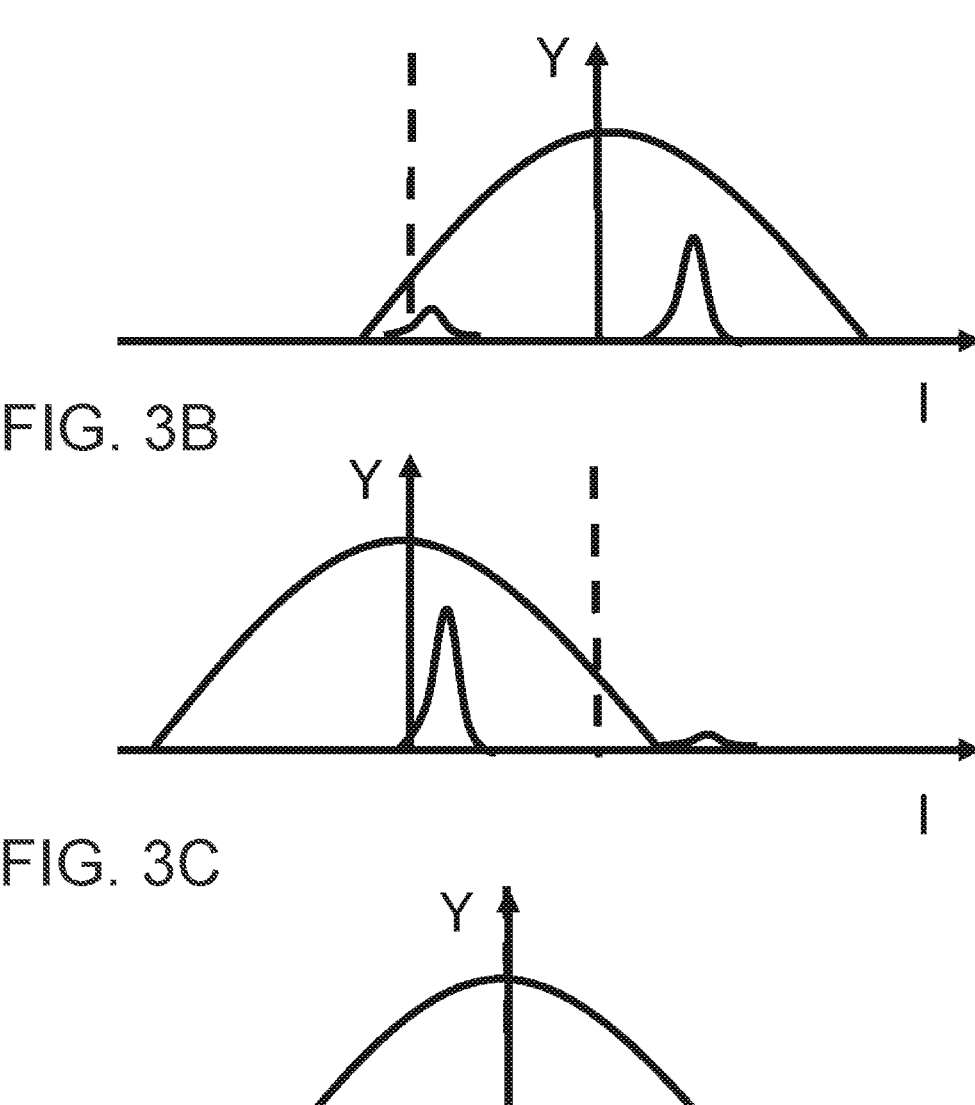
FIGS. 3A to 3C are diagrams illustrating a frequency spectrum of interference light.

A distance measurement method in the optical measurement device 100 according to Embodiment 1 that uses two beams of reference light will be described. FIGS. 3A to 3C are views illustrating frequency spectra of interference light. FIG. 3A illustrates the frequency spectrum in a case where a measurement range is adjusted to surroundings of the target 14. FIG. 3B illustrates the frequency spectrum in a case where the measurement range is adjusted to surroundings of the connector 7. FIG. 3C illustrates the frequency spectrum of the interference wave obtained from two beams of reference light.

The adjustment unit 9 according to Embodiment 1 includes the switch units 20, 21, and 22. There are two frequency spectra that relate to measurement light, and one of the two frequency spectra derives from reflection light from the surface of the target 14 and the other one derives from reflection on an end surface of the connector 7. It is assumed that both of the spectra according to Embodiment 1 cannot be accurately measured in a single measurement range that is limited by the coherence length.

In FIGS. 3A to 3C, light path lengths of the reference light R1 and R2 from the split unit 4 to the adjustment unit 9 are $L_{R1}$ and $L_{R2}$ ($L_{R1} < L_{R2}$), respectively. The optical path length of the measurement light S that is reflected by the target 14 and reaches the adjustment unit 9 from the split unit 4 is $L_S$. Furthermore, the optical path length of the measurement light S that is reflected by the connector 7 and reaches the adjustment unit 9 from the split unit 4 is $L_F$. In this case, $L_S > L_F$ holds.

FIG. 3A illustrates an example where the reference light R2 and the measurement light S reflected by the target 14 are caused to interfere with each other. In this case, the switch units 20, 21, and 22 of the adjustment unit 9 select the upper side, the upper side, and both, respectively. A light path length difference $L_A$ between the measurement light S and the reference light R2 is expressed by equation (2).

$$L_A = L_S - L_{R2} \qquad (2)$$

As illustrated in FIG. 3A, the frequency spectrum of the interference wave is produced at a position that is $L_A$ apart rightward from a target center of the coherence length of the reference light R2. The frequency spectrum of the interference wave simultaneously produced on the left side of the center derives from reflection on the end surface of the connector 7.

FIG. 3B illustrates an example where the reference light R1 and the measurement light S reflected by the connector 7 are caused to interfere with each other. In this case, the switch units 20, 21, and 22 of the adjustment unit 9 select the lower side, the lower side, and both, respectively. A light path length difference $L_B$ between the measurement light S and the reference light R1 is expressed by equation (3).

$$L_B = L_F - L_{R1} \qquad (3)$$

As illustrated in FIG. 3B, the frequency spectrum of the interference wave is produced at a position that is $L_B$ apart rightward from a target center of the coherence length of the reference light R1. The frequency spectrum of the interference wave simultaneously produced greatly apart leftward from the center derives from reflection on the target 14.

A case will be studied where there are two distance measurement target reflection points as described above. A light path length of a route of an optical fiber or the like through which laser light propagates due to disturbance such as change in an environmental temperature or a temperature distribution in a longitudinal direction. Consequently, it is possible to suppress fluctuation of the light path length by obtaining a difference between distance measurement values between the target 14 and the connector 7.

According to a conventional method that cannot change a light path length of reference light, $L_{R1} = L_{R2}$ holds. In a case where a distance from the connector 7 to the target 14 is a measurement value, a measurement value $L_{measure1}$ obtained by conventional measurement is expressed by equation (4).

$$L_{measure1} = (L_S - L_F)/2 = (L_A - L_B)/2 \qquad (4)$$

According to the conventional method, when a distance between two reflection points of the target 14 and the connector 7 is long compared to the coherence length, it is not possible to obtain a sufficiently strong frequency spectrum. Furthermore, in this case, both of $L_{R1}$ and $L_{R2}$ have different temperature distributions and fluctuations from those of other light paths. Consequently, it is possible to eliminate an influence of a temperature distribution and fluctuation for measurement by measuring a difference between both of these temperature distributions and fluctuations.

According to Embodiment 1, the adjustment unit 9 causes the two beams of the reference light R1 and R2 to interfere with each other, so that it is possible to obtain a light path length difference $L_C$ between the reference light R1 and the reference light R2.

$$L_C = L_{R2} - L_{R1} \qquad (5)$$

According to Embodiment 1, a resulting measurement value $L_{measure2}$ is expressed by equation (6).

$$L_{measure2} = (L_S - L_F)/2 = (L_A - L_B + L_C)/2 \qquad (6)$$

In equation (6), three of the light path length difference $L_A$, the light path length difference $L_B$, and the light path length difference $L_C$ need to be measured. It is possible to suppress fluctuation of the light path length due to temperature change, by quickly switching measurement of the three light path length differences. A fluctuation speed of temperature fluctuation is at an order of um/min, and a sweeping cycle of a general wavelength swept light source exceeds 1 kHz. Consequently, one measurement time is approximately 100 usec and is short, so that it is possible to sufficiently suppress fluctuation of a light path length by switching a measurement target per measurement.

In this case, a ratio of measurement frequency of the light path length difference $L_A$, the light path length difference $L_B$, and the light path length difference $L_C$ may be equally 1:1:1. Furthermore, the measurement frequency may be unequal. It may be possible to obtain a sufficient number of times of averaging, by measuring, a plurality of times, reflection light whose intensity of the frequency spectrum is unknown and that is reflected from the target 14. Furthermore, the ratio may be actively changed depending on the intensity of the frequency spectrum.

As described above, even when a distance to a target significantly fluctuates, it is possible to measure the distance to the target by using two beams of reference light of different light path lengths. Furthermore, a light path length difference between the two beams of reference light is measured, so that it is possible to cancel a light path length of an optical fiber part, and measure a distance from the connector 7 to the target 14. Consequently, it is possible to suppress an influence of fluctuation of the light path length of the optical fiber part due to temperature change or the like.

Although the example where the distance is measured using reflection on the target 14 and reflection on the end surface of the connector 7 has been described, the distance may be measured using reflection on the lens 8 and reflection on the target 14 may be measured when reflection occurs at the lens 8.

Figure 4:
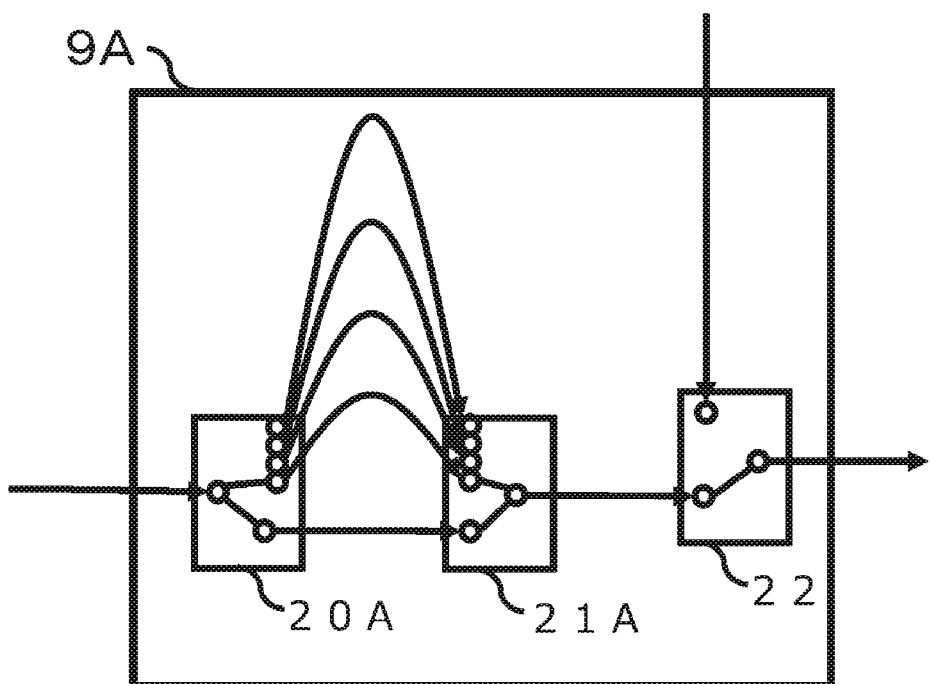
FIG. 4 illustrates a different example of an adjustment unit according to Embodiment 1.

Next, an example where the number of beams of reference light of different light path lengths is increased will be described. FIG. 4 illustrates a different example of the adjustment unit according to Embodiment 1.

An adjustment unit 9A includes switch units 20A, 21A, and 22. The switch units 20A and 21A include switch routes the number of which is increased from two to five compared to the switch units 20 and 21. Consequently, it is possible to create five patterns of reference light of different light path lengths. Reference light are assigned R1, R2, R3, R4, and R5 in order of a shorter light path length of reference light, and their respective light path lengths are $L_{R1}$, $L_{R2}$, $L_{R3}$, $L_{R4}$, and $L_{R5}$. In a case where there are k types of switch routes, light path lengths are $L_{R1}$ to $L_{Rk}$. A light path length difference Lcn between nth reference light Rn and n+1th reference light Rn+1 is within a range of a coherence length of the reference light Rn.

By using the reference light R1, R2, R3, R4, and R5, it is possible to calculate equation (6) using $L_{Csum}$ in equation (7) even in a case where $L_C$ in equation (5) is outside the range of the coherence length.

$$Lcn=L_{R2}-L_{R1}$$

$$Lcn=L_{R3}-L_{R2}$$

$$Lcn=L_{R4}-L_{R3}$$

$$Lcn=L_{R5}-L_{R4}$$

$$L_{Csum}=L_{R5}-L_{R1} \tag{7}$$

Thus, it is possible to expand a measurable range by using multiple beams of reference light of different light path lengths.

Furthermore, when a light path length of measurement light including reflection light of the target 14 is slightly longer than the light path length of the reference light R3, it is possible to calculate a measurement value by using the reference light R1, R2, and R3. Consequently, even in a case where a distance to the target 14 significantly fluctuates, it is possible to measure the distance to the target 14 by changing the number of beams of reference light to be used.

Modified Example 1

Figure 5:
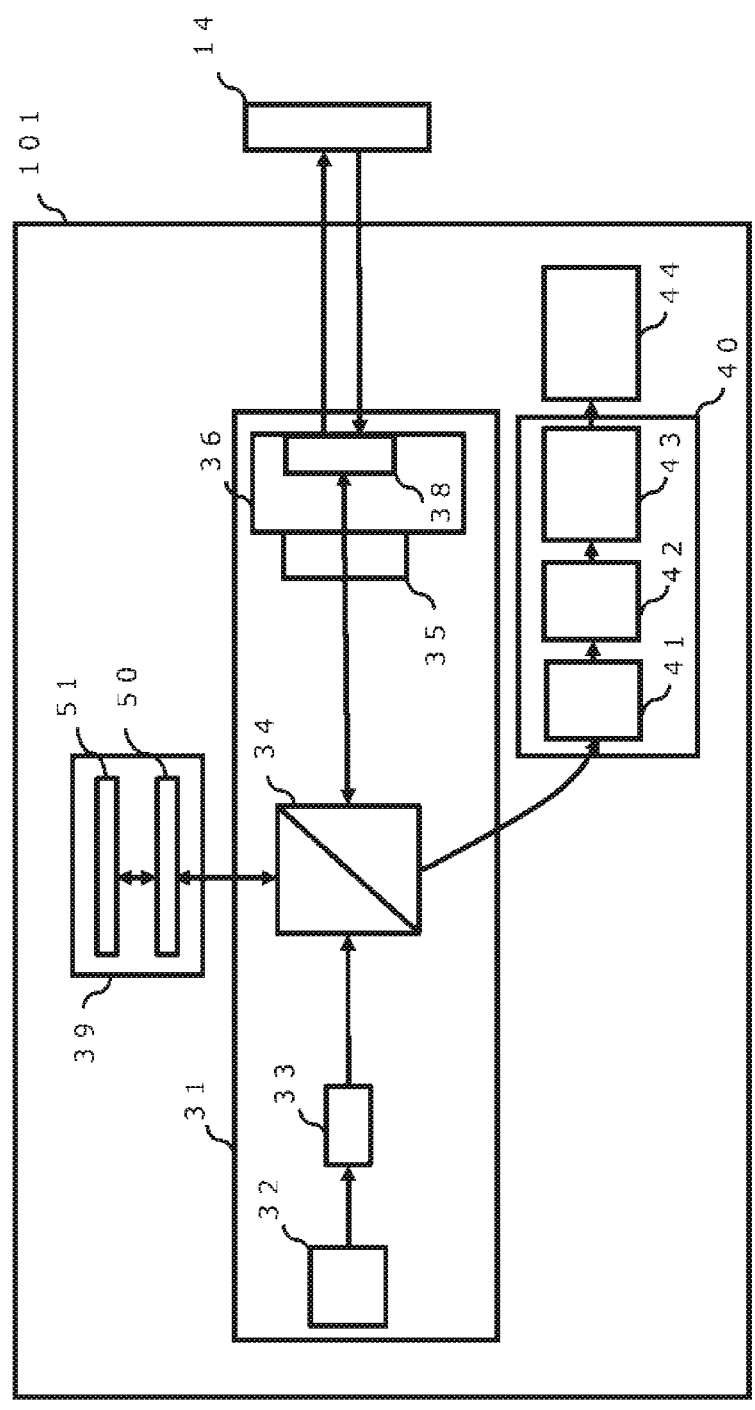
FIG. 5 is a configuration diagram illustrating an example of a case where distance measurement is performed using an optical measurement device 101 according to Modified Example 1 of Embodiment 1.

An example where a light path length of reference light is changed using a mirror will be described. FIG. 5 is a configuration diagram illustrating an example of a case where distance measurement is performed using an optical measurement device 101 according to Modified Example 1 of Embodiment 1.

Similarly to the optical measurement device 100, the optical measurement device 101 adjusts the light path length of the reference light, and measures a distance to the target 14. Description of components similar to those in FIG. 1 will be omitted.

<Configuration of Optical Measurement Device 101>

The optical measurement device 101 includes a transmission unit 31, an adjustment unit 39, and a reception unit 40. The optical measurement device 101 may include a processing unit 44.

<<Transmission Unit 31>>

The transmission unit 31 includes a beam splitter 34. The transmission unit 31 may include a light source 32, a condensation unit 33, a shutter 35, and an irradiation unit 36. The transmission unit 31 emits light, and receives reflection light.

<<Light Source 32>>

The light source 32 emits light. The light source 32 emits, for example, white light. The light source 32 emits, for example, continuous light. The light source 32 emits, for example, white light of a predetermined frequency.

<<Light Condensation Unit 33>>

The condensation unit 33 linearly condenses light. The condensation unit 33 includes, for example, a lens, a slit, and the like.

<<Beam Splitter 34>>

The beam splitter 34 splits light. The beam splitter 34 splits light at a predetermined split ratio. The beam splitter 34 includes, for example, a half mirror and the like.

<<Shutter 35>>

The shutter 35 passes light therethrough or blocks the light. The shutter 35 includes, for example, a member that does not transmit light therethrough, and can be opened and closed.

<<Irradiation Unit 36>>

The irradiation unit 36 irradiates the target 14 with light. The irradiation unit 36 may include a lens 38.

<<Lens 38>>

The lens 38 condenses light. The lens 38 is formed using one or more transmission lenses, reflective lenses, or the like.

<<Adjustment Unit 39>>

The adjustment unit 39 switches a light path length. The adjustment unit 39 is formed by using, for example, two or more mirrors 50 and 51. The mirrors 50 and 51 can control a transmittance and a reflectance. The mirrors 50 and 51 may be formed by using, for example, an optical crystal that can electrically control the transmittance and the reflectance. Alternatively, the mirrors 50 and 51 may be able to control the transmittance and the reflectance by mechanically changing their angles.

<<Reception Unit 40>>

The reception unit 40 receives light. The reception unit 40 photoelectrically converts light into an electric signal, and outputs the electric signal. The reception unit 40 may include a dispersion unit 41, a photoelectric conversion unit 42, and a digital conversion unit 43.

<<Dispersion Unit 41>>

The dispersion unit 41 disperses light in space at a predetermined wavelength. The dispersion unit 41 is formed by, for example, a diffraction grating.

<<Photoelectric Conversion Unit 42>>

The photoelectric conversion unit 42 photoelectrically converts light into an electric signal, and outputs the electric signal. The photoelectric conversion unit 42 photoelectrically converts two-dimensional dispersed light, and outputs an analog signal indicating an interference fringe. The photoelectric conversion unit 42 includes, for example, a CMOS element and the like.

<<Digital Conversion Unit 43>>

The digital conversion unit 43 A/D-converts an analog signal into a digital signal, and outputs the digital signal. The digital conversion unit 43 is, for example, an A/D converter.

<<Processing Unit 44>>

The processing unit 44 calculates a distance from a frequency spectrum of an interference wave. The processing unit 44 includes, for example, a processor, a memory, and the like. The processing unit 44 is, for example, a PC.

<<Other Configuration>>

Portions between the light source 32 and the condensation unit 33, the condensation unit 33 and the beam splitter 34, the beam splitter 34 and the irradiation unit 36, the beam splitter 34 and the adjustment unit 39, the beam splitter 34 and the dispersion unit 41, and the dispersion unit 41 and the photoelectric conversion unit 42 are designed in such a way that light propagates in space by optical stages. Consequently, white light is guided through space.

<Operation of Optical Measurement Device 101>

Next, an operation of the optical measurement device 101 will be described.

White light emitted from the light source 32 in the transmission unit 31 is incident on the condensation unit 33. Note that the light source 32 may be provided outside the optical measurement device 101.

The condensation unit 33 linearly condenses the white light from the light source 32. The beam splitter 34 splits the white light condensed by the condensation unit 33. The beam splitter 34 splits the white light as measurement light and reference light at a predetermined split ratio. The measurement light output from the beam splitter 34 passes through the shutter 35, and is incident on the irradiation unit 36. The reference light output from the beam splitter 34 is incident on the adjustment unit 39.

The irradiation unit 36 irradiates the target 14 with the measurement light. For example, the irradiation unit 36 collimates and linearly condenses the measurement light using the lens 38, and irradiates the target 14 with the measurement light. In a case where the measurement light is made linear by the beam splitter 34 or the like, the irradiation unit 36 may not be provided. Alternatively, the irradiation unit 36 may not include the lens 38, and may directly irradiate the target 14 with the measurement light output from the beam splitter 34. The measurement light reflected by the target 14 is guided from the irradiation unit 36 to the beam splitter 34.

The adjustment unit 39 reflects the reference light output from the beam splitter 34, and guides the reference light to the beam splitter 34 again. The adjustment unit 39 controls transmission or reflection of various mirrors, and adjusts a light path length of the reference light.

The beam splitter 34 causes the measurement light output from the irradiation unit 36 and the reference light output from the adjustment unit 39 to interfere with each other, and outputs interference light. As illustrated in, for example, FIG. 5, the beam splitter 34 splits the white light from the condensation unit 33 into reference light reflected by a half mirror, and measurement light having been caused to transmit through the half mirror. Furthermore, the beam splitter 34 causes the measurement light from the irradiation unit 36 to be reflected by the half mirror, and causes the reference light from the adjustment unit 39 to transmit through the half mirror. Consequently, it is possible to direct the reference light and the measurement light to the same direction to interfere with each other.

The reception unit 40 receives the interference light output from the beam splitter 34, and outputs the interference light to the dispersion unit 41. The dispersion unit 41 disperses the interference light in space at a predetermined wavelength. The photoelectric conversion unit 42 photoelectrically converts two-dimensional dispersed light output from the dispersion unit 41, and outputs an analog signal indicating an interference fringe. Furthermore, the digital conversion unit 43 A/D-converts the analog signal, and outputs a digital signal as a reception signal. Thus, the reception unit 40 receives the interference light output from the beam splitter 34, and outputs the reception signal indicating the interference fringe.

The processing unit 44 outputs a distance distribution of a target from the frequency spectrum of the interference fringe on the basis of the reception signal. More specifically, for example, the processing unit 44 measures the frequency spectrum at each point of the target, by performing Fourier transform on the reception signal per point. The distance distribution of the target is determined depending on a light path length difference between the measurement light and the reference light. A frequency obtained when the light path length difference between both of the reference light and the measurement light split by the beam splitter 34 is 0 is 0, and increases in proportion to the light path length difference. A value of the frequency is measured to measure the distance distribution of a measurement target. In this case, the distance at which the frequency spectrum can be obtained is restricted by a coherence length.

A method in the optical measurement device 101 according to Modified Example 1 of Embodiment 1 of measuring a position of the target 14 will be described.

The white light guided from the light source 32 to the beam splitter 34 is linearly formed by the condensation unit 33. Furthermore, both of a light shape in a case where light is radiated on the target 14 and a light shape in a case where light interferes with each other on the beam splitter 34 continue keeping linear shapes. In, for example, FIG. 5, the measurement light emitted from the irradiation unit 36 travels toward a right direction. In this case, a linear light shape is formed in a direction vertical to the right direction, for example an upper and lower direction. The light elongated in the upper and lower direction causes reflection and interference at each point in the upper and lower direction. Hence, the light at each point in the upper and lower direction has an interference component that differs depending on a distance between the reference light and the reflection light depending on the distance distribution of the target. When this interference light is dispersed in space by the dispersion unit, a different interference fringe corresponding to a distance at each point is produced according to a band of the white light. This interference fringe is received by a two-dimensional light reception unit, and the interference fringe at each point is digitally converted, and then is subjected to Fourier transform, so that it is possible to obtain a spectrum indicating the distance at each point.

Similarly to Embodiment 1, a measurable range of the spectrum at each point is restricted by a coherence length. The white light according to Modified Example 1 has a wide line width, and the coherence length is limited to several μm.

A method in the optical measurement device 101 according to Modified Example 1 of adjusting an optical path length of reference light will be described. Functions of the mirrors 50 and 51 and the shutter 35 according to Modified Example 1 correspond to functions of the switch units 20, 21, and 22 of the adjustment unit 9 according to Embodiment 1. A light path length of reference light reflected by the mirror 50 is shorter than a light path length of reference light having transmitted through the mirror 50 and been reflected by the mirror 51.

The beam splitter 34 causes the reference light reflected by the mirror 50 and the measurement light having been reflected by the target 14 and transmitted through the opened shutter 35 to interfere with each other, so that it is possible to obtain the same effect as that in the example according to Embodiment 1 where the reference light R1 and the measurement light S reflected by the target 14 are caused to interfere with each other. Furthermore, the reference light having transmitted through the mirror 50 and been reflected by the mirror 51 and the measurement light having been reflected by the target 14 and transmitted through the opened shutter 35 are caused to interfere with each other, so that it is possible to obtain the same effect as that in the example according to Embodiment 1 where the reference light R2 and the measurement light S reflected by the target 14 are caused to interfere with each other. Furthermore, the mirror 50 transmits therethrough and reflects the reference light at a fixed ratio, the mirror 51 reflects the reference light at a fixed ratio, the shutter 35 is closed to stop the measurement light from the irradiation unit 36, so that it is possible to obtain the same effect as that in the example according to Embodiment 1 where the reference light R1 and the reference light R2 are caused to interfere with each other. In this case, it is also possible to obtain the same effect as that in the example according to Embodiment 1 where the measurement light S and the reference light R1 and R2 reflected by the connector 7 are caused to interfere with each other.

The beam splitter 34 and the shutter 35 generate interference light, and therefore forms an interference unit.

The same description related to equation (1) to equation (7) described in Embodiment 1 applies to Modified Example 1, too. Furthermore, a ratio of measurement frequency of the light path length difference $L_A$, the light path length difference $L_B$, and the light path length difference $L_C$ may be equally 1:1:1. Furthermore, the measurement frequency may be unequal. It may be possible to obtain a sufficient number of times of averaging by measuring, a plurality of times, reflection light whose intensity of the frequency spectrum is unknown and that is reflected from the target 14. Furthermore, the ratio may be actively changed depending on the intensity of the frequency spectrum.

Note that the above-described embodiment covers a range that takes into account a manufacturing tolerance, variations at a time of assembly, and the like. Hence, description indicating a positional relationship between parts or shapes of the parts in the claims indicates that the range that takes into account the manufacturing tolerance, the variations at the time of assembly, and the like is covered.

Furthermore, although the embodiment of the present invention has been described above, the present invention is not limited to this embodiment.

REFERENCE SIGNS LIST

1: transmission unit, 2: light source, 3: sweep unit, 4: split unit, 5: circulator, 6: irradiation unit, 7: connector, 8: lens, 9: adjustment unit, 10: reception unit, 11: photoelectric conversion unit, 12: digital conversion unit, 13: processing unit, 14: target, 20, 21, 22: switch unit, 31: transmission unit, 32: light source, 33: condensation unit, 34: beam splitter, 35: shutter, 36: irradiation unit 38: lens, 39: adjustment unit, 40: reception unit, 41: dispersion unit, 42: photoelectric conversion unit, 43: digital conversion unit, 44: processing unit, 50, 51: mirror, 100, 101: optical measurement device

The invention claimed is:

1. An optical measurement device comprising:

a splitter to split light into reference light and measurement light;

an adjuster to split the reference light into a plurality of beams of reference light having respective different light path lengths;

interference circuitry to obtain first interference light obtained by multiplexing reflection light obtained by reflection when a target is irradiated with the measurement light, and one of two beams of reference light of the plurality of beams of reference light, obtain second interference light obtained by multiplexing the measurement light that is not yet radiated on the target and the other one of the two beams of reference light, and obtain third interference light obtained by multiplexing the two beams of reference light; and processing circuitry to calculate a light path length difference between the reflection light and the one of the two beams of reference light on a basis of a frequency of the first interference light, calculate a light path length difference between the measurement light that is not yet radiated on the target and the other one of the two beams of reference light on a basis of a frequency of the second interference light, and calculate a light path length difference between the two beams of reference light on a basis of a frequency of the third interference light, wherein the optical measurement device measures a distance to the target on a basis of each of the light path length differences calculated by the processing circuitry.

2. The optical measurement device according to claim 1, wherein, in a case where the plurality of beams of light are arranged in order of a shorter light path length, and reference light of an mth light path length where m is an integer equal to or more than one is mth reference light, a light path length difference between the mth reference light and m+1th reference light is within a range of a coherence length.

3. The optical measurement device according to claim 2, wherein a light path length of the mth reference light is calculated using a light path length of first reference light, and a light path length difference of each of the first reference light to the mth reference light.

4. The optical measurement device according to claim 1, wherein the light is light whose frequency continuously changes.

5. The optical measurement device according to claim 1, further comprising a condenser to linearly condense white light, and output the white light to the splitter.

* * * * *